(12) United States Patent
Rout et al.

(10) Patent No.: US 9,699,534 B1
(45) Date of Patent: Jul. 4, 2017

(54) TIME-DOMAIN MULTIPLEXED SIGNAL PROCESSING BLOCK AND METHOD FOR USE WITH MULTIPLE MEMS DEVICES

(71) Applicants: Saroj Rout, Nashua, NH (US); Akhil K. Garlapati, Lexington, MA (US); Qicheng Yu, Lexington, MA (US)

(72) Inventors: Saroj Rout, Nashua, NH (US); Akhil K. Garlapati, Lexington, MA (US); Qicheng Yu, Lexington, MA (US)

(73) Assignee: PANASONIC CORPORATION, Osaka (JP)

( * ) Notice: Subject to any disclaimer, the term of this patent is extended or adjusted under 35 U.S.C. 154(b) by 135 days.

(21) Appl. No.: 14/487,827

(22) Filed: Sep. 16, 2014

Related U.S. Application Data

(60) Provisional application No. 61/878,106, filed on Sep. 16, 2013.

(51) Int. Cl.
| | |
|---|---|
| *H04Q 11/04* | (2006.01) |
| *G01C 19/56* | (2012.01) |
| *H04J 3/02* | (2006.01) |
| *G01C 19/5776* | (2012.01) |
| *G01C 19/5726* | (2012.01) |

(52) U.S. Cl.
CPC ..... *H04Q 11/0421* (2013.01); *G01C 19/5726* (2013.01); *G01C 19/5776* (2013.01); *H04J 3/02* (2013.01)

(58) Field of Classification Search
CPC ............ G01C 19/5776; G01C 19/5726; G01C 19/5719; G01C 19/5769; G01P 1/023; H04Q 11/0421; H04J 3/02

USPC .......................... 73/504.12, 504.04, 510, 511
See application file for complete search history.

(56) References Cited

U.S. PATENT DOCUMENTS

| | | | | |
|---|---|---|---|---|
| 4,566,327 A | * | 1/1986 | Rider ..................... | G01C 19/04 73/504.03 |
| 4,914,598 A | * | 4/1990 | Krogmann ............. | G01C 21/16 244/177 |
| 5,908,986 A | * | 6/1999 | Mitamura .......... | G01C 19/5719 73/504.12 |
| 7,023,065 B2 | | 4/2006 | Ayazi et al. | |
| 7,543,496 B2 | | 6/2009 | Ayazi et al. | |
| 7,578,189 B1 | | 8/2009 | Mehregany | |
| 7,892,876 B2 | | 2/2011 | Mehregany | |
| 8,166,816 B2 | | 5/2012 | Ayazi et al. | |
| 8,173,470 B2 | | 5/2012 | Mehregany | |
| 8,372,677 B2 | | 2/2013 | Mehregany | |
| 8,528,404 B2 | | 9/2013 | Ayazi | |
| 8,847,693 B2 | * | 9/2014 | Seeger ..................... | H03B 5/30 331/116 M |
| 2003/0024312 A1 | * | 2/2003 | Babala ................ | B60R 21/0132 73/504.02 |
| 2004/0180640 A1 | * | 9/2004 | Zipper .................. | H03B 5/368 455/196.1 |
| 2009/0007661 A1 | * | 1/2009 | Nasiri ..................... | G01P 1/023 73/504.03 |

(Continued)

*Primary Examiner* — Helen Kwok
(74) *Attorney, Agent, or Firm* — McDermott Will & Emery LLP

(57) ABSTRACT

A sense channel signal processing block is time-domain multiplexed among multiple MEMS devices and utilizes an anti-aliasing filter disposed after track-and-hold switches, to prevent the bandwidth of the sense channel from being limited by the anti-aliasing filter.

20 Claims, 2 Drawing Sheets

(56) References Cited

U.S. PATENT DOCUMENTS

| | | | |
|---|---|---|---|
| 2009/0190672 A1* | 7/2009 | Mathys | H04L 27/0008 375/240.27 |
| 2010/0071467 A1* | 3/2010 | Nasiri | G01C 19/5719 73/504.12 |
| 2010/0093282 A1* | 4/2010 | Martikkala | H04B 17/364 455/63.4 |
| 2012/0227487 A1 | 9/2012 | Ayazi et al. | |
| 2012/0272733 A1* | 11/2012 | Ronen | G01C 19/5755 73/504.12 |
| 2013/0125614 A1* | 5/2013 | Casinovi | G01C 19/5776 73/1.77 |
| 2014/0290361 A1* | 10/2014 | Kim | G01C 19/5776 73/504.12 |

* cited by examiner

TIME-DOMAIN MULTIPLEXED SIGNAL PROCESSING BLOCK AND METHOD FOR USE WITH MULTIPLE MEMS DEVICES

RELATED APPLICATIONS

This application claims priority to U.S. Provisional Patent Application Ser. No. 61/878,106 filed on Sep. 16, 2013, entitled MULTIPLEXING SCHEME FOR A MULTI-AXIS MEMS DEVICE TO SHARE THE SIGNAL PROCESSING BLOCKS AMONG THE MULTIPLE CHANNELS, the entire subject matter of which is incorporated herein by this reference for all purposes.

FIELD OF THE INVENTION

The disclosure relates to Microelectromechanical Systems (MEMS) devices, and, more specifically, to a system and technique for using a single sense channel to process output signals generated by multiple MEMS devices.

BACKGROUND OF THE INVENTION

Inertial measurement devices, such as gyroscopes and accelerometers, provide high-precision sensing, however, historically, their cost, size, and power requirements have prevented their widespread use in industries such as consumer products, gaming devices, automobiles, and handheld positioning systems. More recently, micro-electro-mechanical systems (MEMS) device implementations of gyroscopes and accelerometers have been gaining increased attention from multiple industries since micro-machining technologies have made fabrication of miniature gyroscopes and accelerometers possible. Miniaturization also enables integration of multiple MEMS devices with readout electronics on the same die, resulting in reduced size, cost, and power consumption as well as improved resolution by reducing noise.

Current integrated circuit component implementations of a MEMS system containing multiple inertial measurement devices use separate analog signal processing blocks for each unique MEMS device, such signal processing blocks, typically include a trans-impedance amplifier (TIA), programmable gain amplifier (PGA), zero-IF mixer (ZIF Mixer), and a rate amplifier (Rate-Amp), collectively usually referred to as "sense channel", for each MEMS device in the MEMS system. Such designs include multiple occurrences of identical components and add to the space, expense and fabrication complexity of the MEMS system.

Accordingly, a need exists for a more efficient signal processing architecture for a system having multiple MEMS devices which eliminates the redundancy of multiple occurrences of identical components.

SUMMARY OF THE INVENTION

Disclosed is an architecture comprising a common signal processing block shared among multiple MEMS devices in time-domain multiplexed manner. In the disclosed implementation, multiple instances of MEMS gyroscopes are used with a single signal processing block, e.g. a single sense channel, which is multiplexed in time-domain to be shared among the multiple MEMS devices. By moving the 'anti-aliasing' filter after the track-and-hold switches, as described herein, a single analog processing block may be shared among multiple MEMS devices in a multiplexed manner serving as the sense channel for each device.

According to one aspect of the disclosure, a sense channel apparatus comprises: a signal processing module having an input section coupled to an output section of each of a plurality of MEMS devices and further having an output section, wherein the signal processing module processes signals from the analog output section of each of the plurality of MEMS devices in a multiplexed, time domain manner. In one embodiment, the sense channel apparatus is combined with a plurality of MEMS devices, each having an analog-output section coupled to an input section of the signal processing module. In another embodiment, at least one of the MEMS devices comprises a gyroscope.

According to another aspect of the disclosure, a sense channel apparatus comprises: a) a plurality of trans-impedance amplifiers each having an input section for receiving an analog signal from a MEMS device and an output section coupled to an input of a programmable gain amplifier; b) a zero-IF mixer operatively coupled intermediate an output of the programmable gain amplifier and an input of a rate amplifier; c) a plurality of rate amplifier switches, each having an input section coupled to an output of the rate amplifier; and d) a plurality of filters, each having an input coupled to an output of one of the plurality of rate amplifier switches. In one embodiment, the sense channel apparatus is combined with a plurality of MEMS devices, each having an analog-output section coupled to an input section of one of the plurality of trans-impedance amplifiers. In another embodiment, at least one of the MEMS devices comprises a gyroscope.

According to still another aspect of the disclosure, a method of multiplexing the analog output of multiple MEMS devices through a single sense channel comprises: A) providing a signal processing module having an input section coupled to an output section of each of a plurality of MEMS devices and further having an output section, and B) processing signals from the analog output sections of each of the plurality of MEMS devices in a multiplexed, time domain manner. In one embodiment, B) comprises: B1) processing signals from a first of the plurality of MEMS devices with the signal processing block during a first time segment and B2) processing signals from a second of the plurality of MEMS devices with the signal processing block during a second time segment different from the first time segment.

BRIEF DESCRIPTION OF THE DRAWINGS

Embodiments of the disclosed subject matter are described in detail below with reference to the following drawings in which.

DETAILED DESCRIPTION

The present disclosure will be more completely understood through the following description, which should be read in conjunction with the drawings. The skilled artisan will readily appreciate that the methods, apparatus and systems described herein are merely exemplary and that variations can be made without departing from the spirit and scope of the disclosure.

MEMS devices, such as those disclosed in U.S. Pat. Nos. 7,578,189; 7,892,876; 8,173,470; 8,372,677; 8,528,404;

7,543,496; and 8,166,816, are able to sense rotational (i.e. angle or angular velocity of rotation around an axis) or translational motion (i.e. linear acceleration along an axis) around and along axes. The sense channel disclosed herein may be used with MEMS systems directed towards sensing rotation and acceleration around all three axes of free space using multiple inertial measurement MEMS devices. Such devices may have six degrees of freedom in their mechanical design to be able to sense six independent motion signals, i.e. linear acceleration along and angular velocity signals around three orthogonal axes of free space. The apparatus and techniques disclosed herein may be used with any number of commercially available MEMS gyroscopes including those disclosed in U.S. Pat. No. 7,023,065 United States Patent Application Publication 2012/0227487, and United States Patent Application Publication 2012/0227487, the subject matter of which are incorporated herein by this reference for all purposes.

Figure 1:
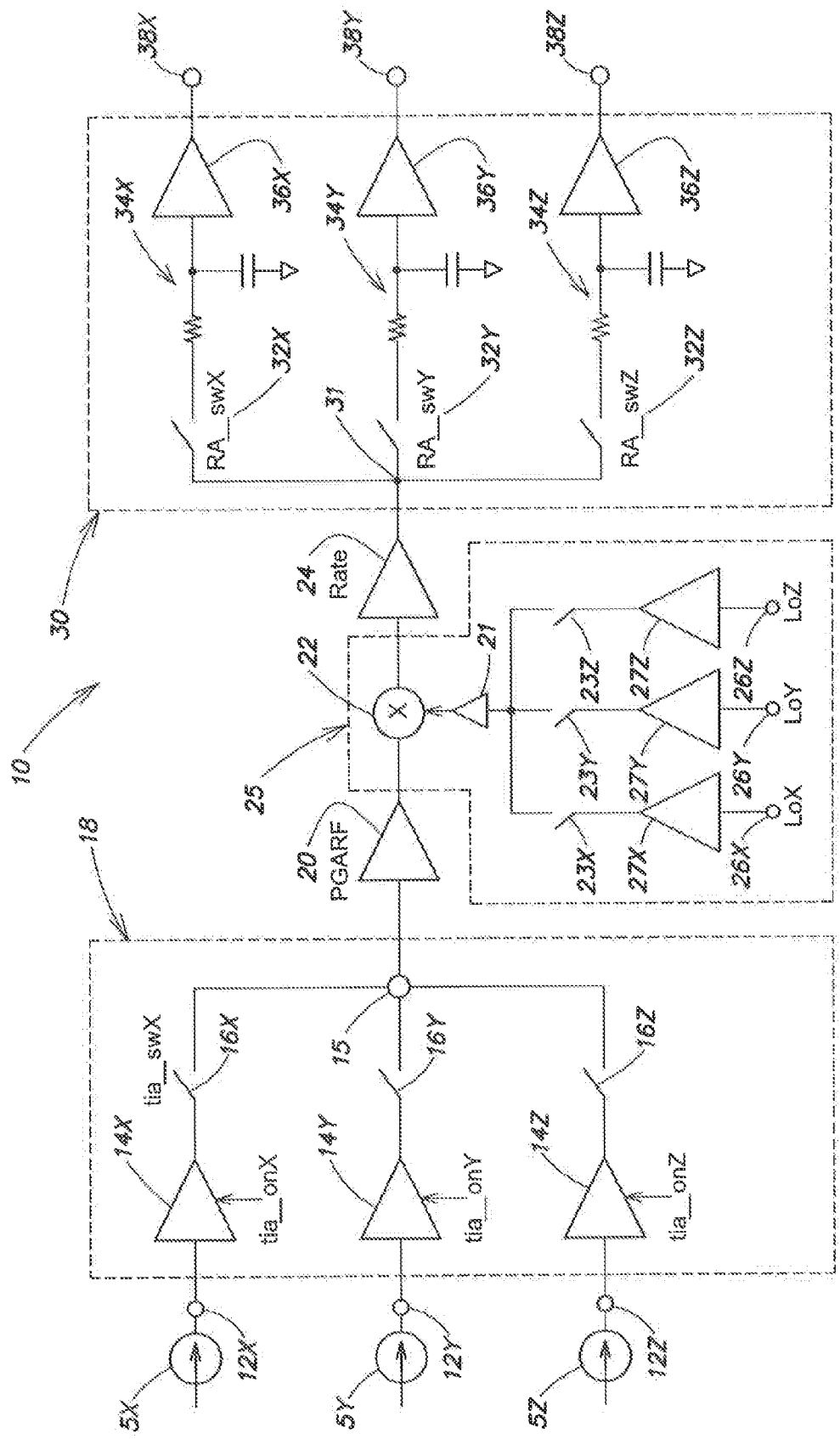
FIG. 1 illustrates a switching architecture for multiple MEMS devices in accordance with the disclosure.

FIG. 1 illustrates a basic architecture for switching in a time-domain multiplexed manner, and, therefore, sharing a common analog signal processing block, referred to as sense channel 10, among three MEMS devices, gyroscopes 5X, 5Y and 5Z. As such, sense channel 10 provides a common signal processing block which is shared in a time-domain multiplexed manner, among the X channel, Y channel and Z channel associated with gyroscopes 5X, 5Y and 5Z, respectively, where each of the respective the X channel, Y channel and Z channel comprise the selectively configurable signal path of sense channel 10 from their respective input node 12 to their respective output node 38, as illustrated in FIG. 1.

In an illustrative embodiment, sense channel 10 comprises, trans-impedance amplifier (TIA) module 18, programmable gain amplifier (PGA) 20, zero-IF mixer (ZIF Mixer) module 25, and a rate amplifier (Rate-Amp) 24, and a rate amplifier switch module 30, as explained in greater detail herein.

Trans-impedance amplifier (TIA) module 18 comprises a plurality of trans-impedance amplifier and switch circuit paths, one for each analog input provided to TIA section 18. As illustrated, a trans-impedance amplifier 14X has an input node 12X for receiving the analog signal output of a MEMS device, here gyroscope 5X. TIA 14X includes a second input for receiving a selection signal, TIA_onX. A switch 16X is disposed intermediate the output of TIA 14X and a common output node 15 of TIA module 18 which, in turn, is coupled to the input of programmable gain amplifier (PGA) 20. Similarly, trans-impedance amplifier 14Y has an input node 12Y for receiving the analog signal output of a MEMS device, here gyroscope 5Y. TIA 14Y includes a second input for receiving a selection signal, TIA_onY. A switch 16Y is disposed intermediate the output of TIA 14Y and the output node 15 of TIA module 18, In a similar manner, a trans-impedance amplifier 14Z has an input node 12Z for receiving the analog signal output of a MEMS device, here gyroscope 5Z. TIA 14Z includes a second input for receiving a selection signal, TIA_onZ. A switch 16Z is disposed intermediate the output of TIA 14Z and the output node 15 of TIA module 18.

Whichever selection signal to TIA 14X, 14Y or 14Z is asserted along with closure of its associated switch 16X, 16Y or 16l respectively, will determine which of the signal outputs of TIA 14X, 14Y or 14Z will be provided through output node 15 to the input section of programmable gain amplifier (PGA) 20. The output section of programmable gain amplifier 20 is coupled to the input section of zero-IF mixer (ZIF Mixer) module 25.

ZIF Mixer module 25 comprises a demodulator 22 which receives the outputs of programmable gain amplifier 20 and a buffer 21, as illustrated. The input of buffer 21 is coupled through a common node to three internal circuit branches, one for each of the X, Y and Z channels. Each circuit branch comprises in series an input node 26, a buffer 27, and a switch 23, as illustrated. Branch X comprises in series an input node 26X, a buffer 27X, and a switch 23X, as illustrated. Branch Y comprises in series an input node 26Y, a buffer 27Y, and a switch 23Y, as illustrated. Branch Z comprises in series an input node 26Z, a buffer 27Z, and a switch 23Z, as illustrated. The output of demodulator 22 which also functions as the output of zero-IF mixer module 25 is coupled to the input section of rate amplifier 24, as illustrated. Rate amplifier 24 may be implemented with a programmable gain amplifier, similar to PGA 20 herein. The output of rate amplifier 24 is coupled to the input node 31 of rate amplifier switch module 30.

Rate amplifier switch module 30 comprises a common input node 31 coupled to three internal circuit branches, one for each of the X, Y and Z channels, Each circuit branch comprises in series a rate switch 32, filter 34, buffer 36 and output node 38. The X channel branch comprises in series rate switch 32X, filter 34X, buffer 36X and output node 38X, as illustrated. The Y channel comprises in series rate switch 32Y, filter 34Y, buffer 36Y and output node 38Y, as illustrated. Similarly, the Z channel comprises in series rate switch 32Z, filter 34Z, buffer 36Z and output node 38Z as illustrated. Filter 34X, 34Y and 34Z may be implemented with a resistor and capacitor, as illustrated and function as an anti-aliasing filter.

Using the sense channel 10 of FIG. 1, when the gyroscope 5X is being sampled, the corresponding Rate-Amp switch 32X is turned on such that the output samples the X channel through the common sense channel 10, The same applies for the Y and Z channels. Typically in a switching architecture, a set of anti-aliasing filters is required just before the Rate-Amp switches to avoid noise folding. However, this poses a fundamental problem in a multiplexed architecture. For a given switching frequency (Fsw) the bandwidth of anti-aliasing filter needs to be less than Fsw/2, half the switching frequency. However, the minimum bandwidth of the sense channel is needed to be, typically, approximately five times the switching frequency (5×Fsw) so that the sense channel can settled to the desired value quickly between switching among channels. These two requirements are in conflict.

In the disclosed sense channel 10, the anti-aliasing filters 34 for each of the X, Y, and Z channels are located after their respective rate-amp switches 32, as show in FIG. 1, allowing sense channel 10 to meet both the noise folding and settling requirement. Since the anti-aliasing filters 34 are after the rate-amp switches 32, the sense channel 10 is limited only by it's inherent bandwidth and not the bandwidth of the anti-aliasing filters 34.

It has been demonstrated empirically through simulation and test results that placing the anti-aliasing filter after the switches avoids the folding of wideband noise, provided the bandwidth of the filter (BWfilt) is less than the switching frequency. Finally, the bandwidth of the incoming signal (BWsig) from the gyroscope is typically much lower than the switching frequency and hence does not affect the signal either.

Without limiting the scope of this disclosure, in an illustrative embodiment of the disclosed architecture, typical frequency values may be as follows:

Fsw=22 kHz,
BWfilt=20 kHz
BWsig=500 Hz

Sharing a common set of analog blocks among the three X, Y, and Z channels results in reducing the power and area of the sense channel 10 by approximately three times which is a significant advantage over the non-sharing architectures.

Figure 2:
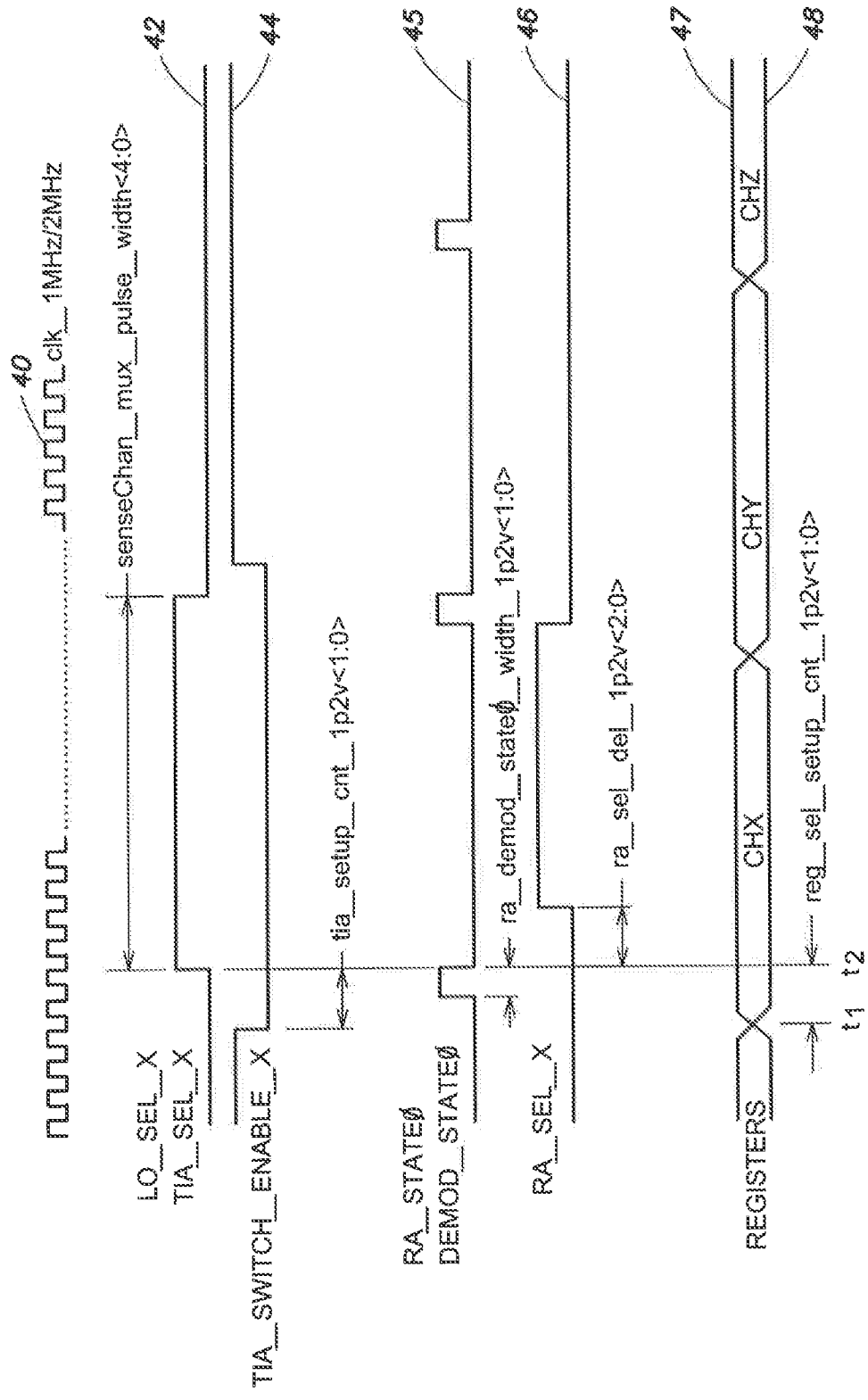
FIG. 2 illustrates a timing diagram of the switching signals for the switching architecture of FIG. 1 in accordance with the disclosure.

FIG. 2 illustrates various signals used to enable the X channel in accordance with the disclosed architecture of FIG. 1. Similar signals with similar relative timing would be us to enable the Y and Z channels. In FIG. 1, signal 40 is a pulse wave signal with a 50% duty cycle which serves as a clock signal to sense channel 10. Signal 42 represents the signal supplied to buffer 27X of LO_SEL_X of ZIF Mixer module 25 and the TIA_SEL_X signal supplied to TIA 14X of trans-impedance amplifier (TIA) module 18 at time t1, as illustrated. Signal 44 represents the TIA_SWITCH_ENABLE_X signal provided to switch 16X and is deasserted at time t2, two clock cycles before signal 42 is asserted. The period in which signal 42 is asserted represents the sense channel multiplexer pulse width. The difference between time t1 and time t2 represents the period for trans-impedance amplifier setup and register selection set up as illustrated by the transitions in register select signals 47 and 48. Signal 45 represents the rate amplifier state zero and demodulate state signals, as illustrated, which are applied to the rate amplifier 24 and demodulator 22, respectively, simultaneously. Signal 46 represents the rate amplifier select signal, as illustrated, and is applied to the rate amplifier 24.

It will be obvious to those reasonably skilled in the art that modifications to the apparatus and process disclosed here in may occur, including substitution of various component values or nodes of connection, signals or signal timing without parting from the true spirit and scope of the disclosure. For example, the circuit described herein may be implemented on an ASIC or formed with discrete components or any combination thereof to realize the system disclosed herein, in addition, any type of semiconductor fabrication technology may be used to implement the switching architecture disclosed herein.

What is claimed is:

1. A sense channel system comprising:
   a signal processing module having an input section coupled to an analog output section of each of a plurality of MEMS devices and further having an output section,
   wherein the signal processing module processes signals from the analog output section of each of the plurality of MEMS devices in a multiplexed, time domain manner, and
   the signal processing module includes a zero-IF mixer configured to demodulate output signals from the plurality of MEMS devices, the zero-IF mixer having a plurality of internal circuit branches associated with the plurality of MEMS devices, respectively.

2. The system of claim 1 wherein the signal processing module, wherein the zero-IF mixer is operatively coupled intermediate a programmable gain amplifier section and a rate amplifier section.

3. The system of claim 1 wherein the signal processing module further comprises:
   a plurality of filters, and
   a plurality of rate amplifier switches, each having an input section coupled to an output of a rate amplifier and an output section coupled to one of the filters,
   wherein each of the plurality of rate amplifier switches and filters is associated with one of the MEMS devices.

4. The system of claim 1 wherein the signal processing module further comprises:
   a plurality of trans-impedance amplifiers each having an output section coupled to an input of a programmable gain amplifier,
   wherein each of the plurality of trans-impedance amplifiers is associated with one of the MEMS devices.

5. The system of claim 1 wherein each of the plurality of MEMS devices comprises a gyroscope.

6. The system of claim 1 wherein the signal processing module functions as a sense channel for only one of the plurality of MEMS devices at a given time.

7. A sense channel apparatus comprising:
   a) a plurality of trans-impedance amplifiers each having an input section for receiving an analog output signal from one of a plurality of MEMS devices and an output section coupled to an input of a programmable gain amplifier;
   b) a zero-IF mixer having a plurality of internal circuit branches associated with the plurality of MEMS devices, respectively, operatively coupled intermediate an output of the programmable gain amplifier and an input of a rate amplifier;
   c) a plurality of rate amplifier switches, each having an input section coupled to an output of the rate amplifier; and
   d) a plurality of filters, each having an input coupled to an output of one of the plurality of rate amplifier switches.

8. The sense channel apparatus of claim 7 in combination with a plurality of MEMS devices, each having an analog-output section coupled to an input section of one of the plurality of trans-impedance amplifiers.

9. The sense channel apparatus of claim 8 wherein at least one of the MEMS devices comprises a gyroscope.

10. A method of multiplexing an output of a plurality of MEMS devices through a single sense channel comprises:
    A) providing a signal processing module having an input section coupled to output sections of the plurality of MEMS devices, respectively, and further having an output section, and
    B) processing signals from the output sections of the plurality of MEMS devices in a multiplexed, time domain manner,
    wherein the signal processing module includes a zero-IF mixer having a plurality of internal circuit branches associated with the plurality of MEMS devices, respectively.

11. The method of claim 10 wherein B) comprises:
    B1) processing signals from a first of the plurality of MEMS devices with the signal processing module block during a first time segment.

12. The method of claim 11 wherein B) comprises:
    B2) processing signals from a second of the plurality of MEMS devices with the signal processing module during a second time segment different from the first time segment.

13. The sense channel system according to claim 1, wherein each internal circuit branch outputs a signal indicating operation of associated one of the MEMS devices.

14. The sense channel apparatus according to claim 7, wherein each internal circuit branch outputs a signal indicating operation of associated one of the MEMS devices.

15. The method according to claim 10, wherein each internal circuit branch outputs a signal indicating operation of associated one of the MEMS devices.

16. The sense channel system of claim 1, wherein
the zero-IF mixer includes a demodulator and a plurality of buffers,
each of the plurality of the internal circuit branches has one of the plurality of buffers,
the demodulator is coupled to each of the plurality of buffers, and
each of the plurality of buffers is associated with one of the plurality of MEMS devices.

17. The sense channel apparatus of claim 7, wherein
the zero-IF mixer includes a demodulator and a plurality of buffers,
each of the plurality of the internal circuit branches has one of the plurality of buffers,
the demodulator is coupled to each of the plurality of buffers, and
each of the plurality of buffers is associated with one of the plurality of MEMS devices.

18. The sense channel apparatus of claim 7 further comprising:
a plurality of trans-impedance amplifier switches, each having an input section coupled to the output section of one of the plurality of trans-impedance amplifiers and an output section coupled to the input section of the programmable gain amplifier,
wherein each of the plurality of trans-impedance amplifier switches operates in synchronization with corresponding one of the plurality of rate amplifier switches.

19. The sense channel system of claim 3, wherein each of the filters is implemented with a resistor and a capacitor.

20. The sense channel apparatus of claim 7, wherein each of the filters is implemented with a resistor and a capacitor.

* * * * *